United States Patent
Hirano et al.

(10) Patent No.: US 8,895,185 B2
(45) Date of Patent: Nov. 25, 2014

(54) BINDER RESIN PRECURSOR SOLUTION COMPOSITION FOR ELECTRODE

(75) Inventors: Tetsuji Hirano, Chiba (JP); Toru Kidosaki, Chiba (JP)

(73) Assignee: Ube Industries, Ltd., Yamaguchi (JP)

(*) Notice: Subject to any disclaimer, the term of this patent is extended or adjusted under 35 U.S.C. 154(b) by 673 days.

(21) Appl. No.: 13/203,161

(22) PCT Filed: Mar. 31, 2010

(86) PCT No.: PCT/JP2010/055788
§ 371 (c)(1),
(2), (4) Date: Aug. 24, 2011

(87) PCT Pub. No.: WO2010/113991
PCT Pub. Date: Oct. 7, 2010

(65) Prior Publication Data
US 2011/0305951 A1 Dec. 15, 2011

(30) Foreign Application Priority Data
Mar. 31, 2009 (JP) ................. 2009-085275

(51) Int. Cl.
| | |
|---|---|
| H01M 4/62 | (2006.01) |
| H01G 11/38 | (2013.01) |
| H01G 11/50 | (2013.01) |
| H01M 4/04 | (2006.01) |
| H01M 4/133 | (2010.01) |
| H01M 4/134 | (2010.01) |
| H01M 4/1393 | (2010.01) |
| H01M 4/1395 | (2010.01) |
| H01G 11/28 | (2013.01) |
| H01M 10/052 | (2010.01) |

(52) U.S. Cl.
CPC .............. *H01G 11/38* (2013.01); *H01G 11/50* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/621* (2013.01); *H01G 11/28* (2013.01); *H01M 10/052* (2013.01); *Y02E 60/122* (2013.01); *Y02E 60/13* (2013.01)
USPC .......................... 429/217; 252/182.1; 524/538

(58) Field of Classification Search
CPC ..... H01M 4/0404; H01M 1/133; H01G 11/38
USPC .......................... 429/217; 252/182.1; 524/538
See application file for complete search history.

(56) References Cited

U.S. PATENT DOCUMENTS

| | | | | |
|---|---|---|---|---|
| 4,923,968 | A | * | 5/1990 | Kunimune et al. ............ 528/353 |
| 5,506,291 | A | * | 4/1996 | Okawa et al. ................. 524/413 |
| 2008/0124631 | A1 | * | 5/2008 | Fukui et al. .................... 429/217 |
| 2011/0193016 | A1 | * | 8/2011 | Hirano et al. ................. 252/182.1 |
| 2012/0168688 | A1 | * | 7/2012 | Nakayama et al. ............ 252/511 |

FOREIGN PATENT DOCUMENTS

| | | |
|---|---|---|
| CN | 101151292 | 3/2008 |
| JP | 61-143433 | 7/1986 |
| JP | 63-172735 | 7/1988 |
| JP | 2000-021412 | 1/2000 |
| JP | 3311402 | 8/2002 |
| JP | 2004-247233 | 9/2004 |

(Continued)

OTHER PUBLICATIONS

International Search Report, PCT/JP2010/055788, Jun. 22, 2010.

*Primary Examiner* — Nicholas P D'Aniello
(74) *Attorney, Agent, or Firm* — Young & Thompson

(57) ABSTRACT

A binder resin precursor solution composition for electrode containing at least (A) a polyamic acid having repeating units represented by chemical formulae (1) and (2) in a (1) to (2) molar ratio of 2:8 to 8.5:1.5 and having a tetracarboxylic acid component to diamine component molar ratio of 0.94 to 0.99, (B) a carboxylic acid compound having two pairs of carboxyl groups in the molecule thereof or an ester thereof, and (C) a solvent.

(1)

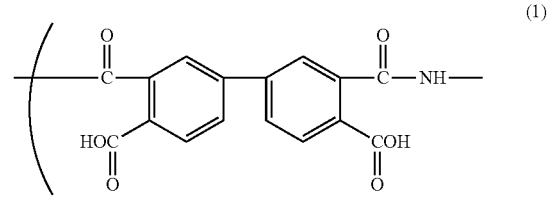

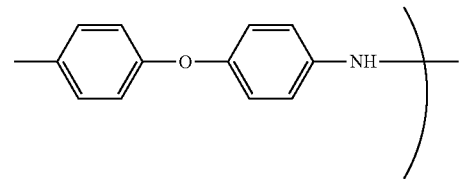

(2)

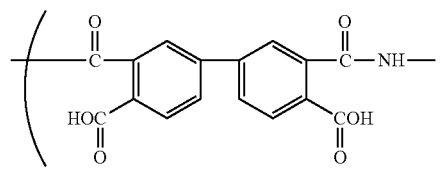

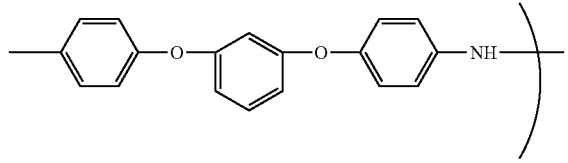

19 Claims, No Drawings

(56) References Cited

FOREIGN PATENT DOCUMENTS

| JP | 2005-285563 | 10/2005 |
|----|-------------|---------|
| JP | 2005-317309 | 11/2005 |
| JP | 2007-149604 | 6/2007 |
| JP | 2008-034352 | 2/2008 |
| WO | WO 2004/004031 | 1/2004 |
| WO | 2006104243 | 10/2006 |

* cited by examiner

BINDER RESIN PRECURSOR SOLUTION COMPOSITION FOR ELECTRODE

TECHNICAL FIELD

This invention relates to a binder resin precursor solution composition for electrode that yields a binder resin with high toughness and is suitable as a binder resin for making an electrode of electrochemical devices, such as lithium ion secondary batteries and electric double layer capacitors.

BACKGROUND ART

A lithium ion secondary battery has been widely used as, for example, power supply for personal digital assistances because of its high energy density and high capacity. In recent years, it has been increasing its use in industry, such as in electric hybrid vehicles that require higher-capacity batteries, and studies have been carried out to increase the capacity and improve the performance. One of the approaches is to use silicon, tin, or their alloys having a high lithium intercalation capacity per unit volume as a negative electrode active material thereby to increase the discharge capacity.

The problem with lithium ion secondary batteries using such a negative electrode active material is that the active material layer can break or separate from the current collector when a binder resin widely employed in electrodes using carbon as an active material, such as polyvinylidene fluoride or a rubber resin, is used to bind the active material or bond the active material layer to the current collector because of larger changes in volume of the negative electrode active material with charge and discharge cycles. If the current collection structure of the negative electrode is so destroyed, the electron conductivity inside the negative electrode reduces, resulting in reduction of cycle characteristics. It has therefore been demanded to develop a binder resin having good toughness to provide resistance against breakage or separation that may be caused by large volumetric changes.

To meet the demand, patent literatures 1 to 4 (see below) propose using high-strength resins, such as polyimide, as a binder resin for a negative electrode active material. Patent literature 5 discloses using a polyimide having an elastic modulus of 3 GPa or more. Patent literature 6 describes a binder resin comprising a polyimide having a 3,3',4,4'-benzophenonetetracarboxylic acid residue. However, there are no concrete proposals about a polyimide-based binder resin having high toughness which is necessary to retain the characteristics despite large volumetric changes, i.e., high elongation at break and high breaking energy, and a composition containing a solution of a precursor thereof.

Patent literature 7 describes polyimide from a polyamic acid composed of 3,3',4,4'-biphenyltetracarboxylic acid as a tetracarboxylic acid component and 4,4'-oxydianiline and 1,3-bis(4-aminophenoxy)benzene as a diamine component. Patent literature 8 discloses a crystalline polyimide resin capable of melt molding. However, both literatures are silent on the mechanical characteristics and have no mention of use as an electrode binder resin.

CITATION LIST

Patent Literature

Patent literature 1: Japanese Patent 3311402
Patent literature 2: WO 04/004031
Patent literature 3: JP 2005-285563A
Patent literature 4: JP 2005-317309A
Patent literature 5: JP 2007-149604A
Patent literature 6: JP 2008-34352A
Patent literature 7: JP 61-143433A
Patent literature 8: JP 63-172735A

SUMMARY OF INVENTION

Technical Problem

An object of the invention is to provide a binder resin precursor solution composition for electrode that yields a binder resin with high toughness and to provide an electrode obtained by using the composition of which the active material layer hardly breaks or delaminates from the current collector despite large volume changes, particularly a negative electrode for a lithium ion secondary battery.

Solution to Problem

The present inventors have found that a binder resin with high toughness is obtained from a binder resin precursor solution composition for electrode comprising (A) a polyamic acid having repeating units each having a specific structure, (B) a carboxylic acid compound having two pairs of carboxyl groups in the molecule thereof or an ester thereof, and (C) a solvent. The invention has been completed based on this finding.

The invention provides a binder resin precursor solution composition for electrode containing at least (A) a polyamic acid having repeating units represented by chemical formulae (1) and (2) below in a (1) to (2) molar ratio of 2:8 to 8.5:1.5 and having a tetracarboxylic acid component to diamine component molar ratio of 0.94 to 0.99, (B) a carboxylic acid compound having two pairs of carboxyl groups in the molecule thereof or an ester thereof, and (C) a solvent.

[Chem. 1]

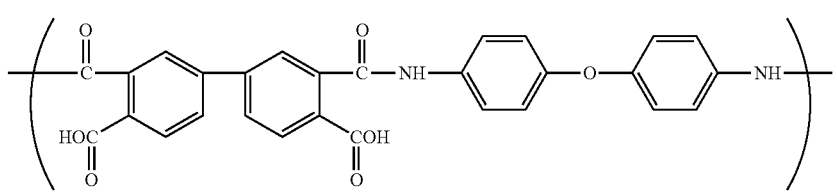

(1)

[Chem. 2]

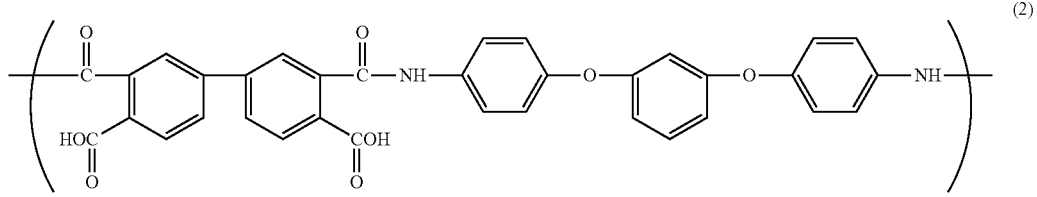

It is preferred that the mole number of the carboxylic acid compound having two pairs of carboxyl groups per molecule or an ester thereof as component (B) be 0.9 to 1.1 times the difference between the mole number of the diamine component and that of the tetracarboxylic acid component in the polyamic acid as component (A).

It is preferred that a binder resin obtained from the precursor solution composition has a weight gain of 5% by weight or less after 24 hours immersion in dimethyl carbonate at 50° C.

It is preferred that a binder resin obtained from the precursor solution composition has a tensile elongation at break of 120% or more and a tensile breaking energy of 130 J/cm$^3$ or more as measured after 24 hours immersion in dimethyl carbonate at 50° C. followed by no drying.

The invention also provides an electrode mixture paste containing the precursor solution composition and an electrode active material; an electrode obtained by applying the electrode mixture paste to a current collector and heating the applied electrode mixture paste to remove the solvent and to cause imidization; and a lithium ion secondary battery having the resulting electrode. It is preferred that the electrode active material be carbon powder, silicon powder, tin powder, or powder of an alloy containing silicon or tin.

Advantageous Effects of Invention

Use of the invention allows for the provision of an electrode of which the active material layer hardly breaks or delaminates from the current collector despite large volume changes with charge and discharge cycles. Use of the electrode provides a lithium ion secondary battery having excellent cycle characteristics.

DESCRIPTION OF EMBODIMENTS

The invention relates to an electrode binder resin precursor solution composition containing at least (A) a polyamic acid having repeating units each having a specific structure, (B) a carboxylic acid compound having two pairs of carboxyl groups per molecule or an ester thereof, and (C) a solvent.

The tetracarboxylic acid component that constitutes the polyamic acid (A) is 3,3',4,4'-biphenyltetracarboxylic acid dianhydride. The diamine component that constitutes the polyamic acid (A) is 4-oxydianiline (ODA) and 1,3-bis(4-aminophenoxy)benzene (TPE-R). It is essential to use these two as a diamine component. The ODA to TPE-R molar ratio, i.e., ODA:TPE-R, is preferably in the range of from 2:8 to 8.5:1.5, more preferably from 3:7 to 8.5:1.5, even more preferably from 3:7 to 8:2. When the molar ratio is out of the preferred range recited, the resulting polyimide resin tends to have a reduced breaking energy and/or a reduced elongation at break.

The tetracarboxylic acid component to diamine component molar ratio, tetracarboxylic acid component/diamine component, is preferably in the range of from 0.94 to 0.99, more preferably from 0.95 to 0.985, even more preferably 0.96 to 0.98. When the molar ratio is smaller than 0.94, the resulting polyimide resin tends to have low toughness, or the solution tends to have too low a viscosity. When the molar ratio is greater than 0.99, the solution tends to have too high a viscosity, which can make it difficult to admix an electrode active material powder with the solution or to uniformly apply the resulting active material mixture to a current collector.

The polyamic acid can be prepared by adding the tetracarboxylic acid component to a solution of the diamine component in a solvent either all at once or in portions and stirring the system. The reaction temperature is preferably 10° to 60° C., more preferably 15° to 55° C., even more preferably 15° to 50° C. At reaction temperatures lower than 10° C., the reaction slows down. At temperatures higher than 60° C., the solution tends to have a reduced viscosity. The reaction time is preferably 0.5 to 72 hours, more preferably 1 to 60 hours, even more preferably 1.5 to 48 hours. When the reaction time is shorter than 0.5 hours, sufficient progress of the reaction may not be expected so that the resulting polyamic acid solution tends to have an instable viscosity. To continue the reaction for more than 72 hours is unfavorable in terms of productivity.

The solvent to be used in the preparation of the polyamic acid may be selected from known organic solvents, such as N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl) ether, 1,2-bis(2-methoxyethoxy)ethane, tetrahydrofuran, bis[2-(2-methoxyethoxy)ethyl] ether, 1,4-dioxane, dimethyl sulfoxide, dimethylsulfone, diphenyl ether, sulfolane, diphenylsulfone, tetramethylurea, anisole, m-cresol, phenol, and γ-butyrolactone. These solvents may be used either alone or as a mixture of two or more thereof. Preferred of them, in terms of polyamic acid solubilizing power and safety, are N,N-dimethylacetamide, N,N-diethylacetamide, N-methyl-2-pyrrolidone, N-ethyl-2-pyrrolidone, 1,3-dimethyl-2-imidazolidinone, and γ-butyrolactone, with N-methyl-2-pyrrolidone, N-ethyl-2-pyrrolidone, and γ-butyrolactone being particularly preferred.

In preparing the electrode binder resin precursor solution composition of the invention, a polyamic acid may be isolated from the polyamic acid solution prepared above by, for example, pouring the reaction mixture into a poor solvent and re-dissolved in a solvent (C) to make a polyamic acid solution consisting of a polyamic acid (A) and a solvent (C). Otherwise, the polyamic acid solution as obtained may be used as such (without isolating the polyamic acid) or as diluted with a solvent (C). From the standpoint of productivity and cost, it is preferred to use the polyamic acid solution as obtained without isolating the polyamic acid.

The concentration of the polyamic acid solution is preferably 5% to 45%, more preferably 7% to 40%, even more preferably 10% to 35%, by weight. At concentrations lower than 5 wt%, the solution has too low a viscosity. At concentrations higher than 45 wt%, the solution is liable to have no flowability. The solution preferably has a rotational viscosity of 1 to 300 poise, more preferably 5 to 275 poise, even more preferably 10 to 250 poise, at 25° C. The solution with a viscosity higher than 300 poise tends to be difficult to uniformly apply to a substrate or otherwise form into shape or admix with an active material powder, or an electrode mixture prepared therefrom tends to be difficult to uniformly apply to a current collector. When the viscosity is lower than 1 poise, the polyimide resin obtained by heat-drying and imidization is liable to have reduced toughness. The solvent (C) can suitably be chosen from the organic solvents described above for use in the polyamic acid preparation.

The carboxylic acid compound having two pairs of carboxyl groups in the molecule thereof or an ester thereof as component (B) is a carboxylic acid compound having two pairs of carboxyl groups capable of reacting with an amino group to form an imide ring per molecule (i.e., four carboxyl groups per molecule) or an ester thereof. Therefore, the two carboxyl groups of each pair are preferably bonded to two carbon atoms adjacent to each other. Since the carboxylic acid compound or an ester thereof is capable of reacting with the terminal amino group of the two polyamic acids to form an imide ring in the step of heating the polyimide precursor solution composition of the invention, it is expected that component (B) is capable of sufficiently increasing the molecular weight of the polyimide on heating.

Examples of component (B) include pyromellitic acid, 4,4'-oxydiphthalic acid, 3,3',4,4'-benzophenonetetracarboxylic acid, 3,3',4,4'-diphenylsulfonetetracarboxylic acid, 1,1,1,3,3,3-hexafluoropropane-2,2-diphthalic acid, 3,3',4,4'-biphenyltetracarboxylic acid, 2,3,3',4'-biphenyltetracarboxylic acid, 2,2',3,3'-biphenyltetracarboxylic acid, 1,2,3,4-benzenetetracarboxylic acid, 3,6-difluoro-1,2,4,5-benzenetetracarboxylic acid, 3,3',4,4'-diphenyl ether tetracarboxylic acid, 1,4-bis(3,4-dicarboxyphenoxy)benzene, 1,3-bis(3,4-dicarboxyphenoxy)benzene, naphthalenetetracarboxylic acid, and a dimethyl ester, a diethyl ether, a dipropyl ester, a diisopropyl ester, or a dibutyl ester of these carboxylic acids.

In view of the toughness of the resulting binder resin and availability, preferred of them are pyromellitic acid, 4,4'-oxydiphthalic acid, 3,3',4,4'-benzophenonetetracarboxylic acid, 3,3',4,4'-biphenyltetracarboxylic acid, 2,3,3',4'-biphenyltetracarboxylic acid, and a dimethyl ester, a diethyl ester, and a diisopropyl ester of these carboxylic acids, with 3,3',4,4'-biphenyltetracarboxylic acid and 2,3,3',4'-biphenyltetracarboxylic acid being particularly preferred. These compounds may be used alone or in combination of two or more thereof. It is noted that existence of more than 5% of an acid dianhydride structure in component (B) can cause instability of the viscosity of the resulting polyamic acid solution.

The electrode binder resin precursor solution composition of the invention is obtained by adding the carboxylic acid compound having two pairs of carboxyl groups per molecule or an ester thereof as component (B) to the above prepared polyamic acid solution and stirring the mixture to dissolve. The dissolving temperature is preferably 10° to 60° C., more preferably 15° to 50° C., even more preferably 15° to 45° C. At temperatures lower than 10° C., the rate of dissolution reduces. At temperature higher than 60° C., the viscosity of the solution composition may lower, or the toughness of the resulting binder resin can reduce.

The mole number of the carboxylic acid compound having two pairs of carboxyl groups in the molecule thereof or an ester thereof as component (B) is preferably 0.9 to 1.1 times, more preferably 0.95 to 1.05 times, even more preferably 0.97 to 1.03 times, and most preferably 0.99 to 1.01 times, the difference between the mole number of the diamine component and that of the tetracarboxylic acid component in the polyamic acid (A). When the amount of component (B) is out of that range, the resulting binder resin tends to have reduced toughness.

It is preferred that the binder resin obtained from the electrode binder resin precursor solution composition above prepared has a weight gain of 5% by weight or less after 24 hours immersion in dimethyl carbonate at 50° C. The weight gain after 24 hours immersion in dimethyl carbonate is determined using a sample film prepared as follows. The electrode binder resin precursor solution composition is cast or otherwise applied on a substrate and heat dried at 120° to 180° C. to form a self-supporting film, which is stripped off the substrate. The film is fixed onto a metal frame or the like and heated at 250° to 350° C. for 5 minutes to 10 hours to prepare a sample film. When the weight gain is larger than 5% by weight, the electrode can increase in volume to a problematic extent on swelling with an electrolyte, and also the toughness reduces. It is also preferred for the binder resin to have a tensile elongation at break of 120% or more and a tensile breaking energy of 130 $J/cm^3$ or more, more preferably 140 $J/cm^3$, as measured after 24 hours immersion in dimethyl carbonate at 50° C. followed by no drying. A binder resin with low tensile elongation at break or low tensile breaking energy is unfavorable because of its poor toughness. While there is basically no upper limit of tensile elongation at break, a binder resin having a tensile elongation at break of 250% or more tends to have a decreased breaking stress and a decreased yield point stress. A preferred range of the tensile elongation at break is therefore from 120% to 250%.

The electrode binder resin precursor solution composition may be admixed to an electrode active material and others at a temperature of 10° to 60° C. to provide an electrode mixture paste. The electrode active material may be chosen from known substances but is preferably selected from carbon powder, silicon powder, tin powder, and powder of an alloy containing silicon or tin. The mixing ratio is preferably such that the total proportion of the polyamic acid as component (A) and the carboxylic acid compound having two pairs of carboxyl groups per molecule thereof or an ester thereof as component (B) is 1 to 15% by weight based on the total solids content of the paste. Out of this range, the resulting electrode can have reduced performance.

An electrode is obtained by casting or otherwise applying the thus prepared electrode mixture paste onto a conductive current collector made, e.g., of copper or aluminum and heat treating the paste at 120° to 400° C., preferably 150° to 380° C., more preferably 180° to 350° C., to remove the solvent and cause imidization. Heating temperatures out of that range can result in insufficient progress of imidization reaction or reduction in physical properties of the molded product. The heating treatment may be carried out in multiple stages in order to prevent foaming or powderization. In that case, the maximum temperature is preferably 150° C. or higher, more preferably 180° C. or higher, even more preferably 200° C. or higher. The total heating time preferably ranges from 3 minutes to 48 hours. Heating for a total of longer than 48 hours is undesirable from a productivity standpoint. Heating for a total of shorter than 3 minutes is undesirable in view of tendency to insufficient imidization or insufficient solvent removal. The resulting electrode is suited for use as a negative electrode of lithium ion secondary batteries.

EXAMPLES

The invention will now be illustrated in greater detail with reference to examples, but it should be understood that the invention is not construed as being limited thereto. Methods for determining the characteristics evaluated in Examples are as follows.

(1) Mechanical Characteristics (Tensile Test)

A tensile test was carried out by pulling a dumbbell specimen (distance between benchmarks: 26.32 mm; width: 4 mm) at a rate of 5 mm/min in an atmosphere of 25° C. and 50% RH using EZTset from Shimadzu Corp. Elastic modulus, elongation at break, and breaking energy were calculated from the tensile break data. The measurement was taken on at least five specimens (n≥5) for each sample to obtain an average.

(2) Solution Viscosity

The viscosity of a polyamic acid solution or a polyimide precursor solution composition was measured with a corn-plate viscometer at 25° C.

(3) Swell Test

A 5 cm side square specimen was cut out of a polyimide film obtained from an electrode binder resin precursor solution composition. The percent swell S was calculated from the following formula, in which Wd is the dry weight of the specimen after 24 hours drying in vacuo at 60°, and Ww is the swollen weight after 24 hours immersion in dimethyl carbonate at 50° C.:

$$S = \frac{W_w - W_d}{W_w} \times 100 \quad \text{[Math. 1]}$$

Example 1

In 182 g of N-methyl-2-pyrrolidone were dissolved 9.01 g (0.045 mol) of 4,4'-oxydianiline (ODA) and 8.77 g (0.03 mol) of 1,3-bis(4-aminophenoxy)benzene (TPE-R). To the solution was added 21.4 g (0.073 mol) of 3,3',4,4'-biphenyltetracarboxylic acid dianhydride, and the mixture was stirred at 25° C. in a nitrogen atmosphere for 24 hours to prepare a polyamic acid solution. The polyamic acid had an ODA to TPE-R molar ratio of 6:4 and a tetracarboxylic acid to diamine component molar ratio of 0.97. To the polyamic acid solution was added 0.74 g (2.25 mmol) of 3,3',4,4'-biphenyltetracarboxylic acid, followed by stirring at 25° C. for 3 hours to prepare an electrode binder resin precursor solution composition having a concentration of 18% by weight and a viscosity of 39 poise. The resulting solution composition was able to be stored stably in a cool and dark place at room temperature for two weeks.

The resulting electrode binder resin precursor solution composition was cast on a glass plate and heat dried at 120° C. for 50 minutes. The film thus formed was stripped off the glass plate, fixed to a metal frame, and heated at 250° C. for 10 minutes and then at 350° C. for 10 minutes to make a 25 µm thick binder resin film. The characteristics of the film are shown in Table 1.

The electrode binder resin precursor solution composition weighing 4.77 g (corresponding to 0.8 g of the solid content after imidization) and 9.2 g of 300 mesh silicon powder were mixed and ground in a mortar to prepare an electrode mixture paste. The paste was able to be spread thinly on copper foil with a glass rod. The copper foil coated with the paste was fixed onto a substrate and heated at 120° C. for 1 hour, 200° C. for 10 minuets, 220° C. for 10 minutes, 250° C. for 10 minutes, 300° C. for 10 minutes, and finally at 350° C. for 10 minutes in a nitrogen atmosphere to make an electrode having a 100 µm thick active material layer.

Example 2

In 128 g of N-methyl-2-pyrrolidone were dissolved 3.00 g (0.015 mol) of 4,4'-oxydianiline (ODA) and 10.23 g (0.035 mol) of 1,3-bis(4-aminophenoxy)benzene (TPE-R). To the solution was added 14.27 g (0.0485 mol) of 3,3',4,4'-biphenyltetracarboxylic acid dianhydride, and the mixture was stirred at 25° C. in a nitrogen atmosphere for 24 hours to prepare a polyamic acid solution. The polyamic acid had an ODA to TPE-R molar ratio of 3:7 and a tetracarboxylic acid to diamine component molar ratio of 0.97. To the solution was added 0.495 g (1 5 mmol) of 3,3',4,4'-biphenyltetracarboxylic acid, followed by stirring at 25° C. for 3 hours to prepare an electrode binder resin precursor solution composition having a concentration of 18% by weight and a viscosity of 28 poise. The resulting solution composition was able to be stored stably in a cool and dark plate at room temperature for two weeks.

The resulting electrode binder resin precursor solution composition was processed in the same manner as in Example 1 to make a 26 µm thick binder resin film. The characteristics of the film are shown in Table 1.

Example 3

An electrode binder resin precursor solution composition was prepared in the same manner as in Example 2, except that 8.01 g (0.04 mol) of 4,4'-oxydianiline (ODA) and 2.92 g (0.01 mol) of 1,3-bis(4-aminophenoxy)benzene (TPE-R) were dissolved in 117 g of N-methyl-2-pyrrolidone. The ODA to TPE-R molar ratio in the polyamic acid was 8:2. The solution had a concentration of 18% by weight and a viscosity of 58 poise. The resulting electrode binder resin precursor solution composition was processed in the same manner as in Example 1 to make a 25 µm thick binder resin film. The characteristics of the film are shown in Table 1.

Comparative Example 1

A polyimide film was obtained in the same manner as in Example 1, except that the polyamic acid solution as prepared was processed without the addition of 3,3',4,4'-biphenyltetracarboxylic acid. The characteristics of the film are shown in Table 1.

Comparative Example 2

A polyamic acid solution was prepared in the same manner as in Example 1, except for using 21.89 g (0.0744 mol) of 3,3',4,4'-biphenyltetracarboxylic acid dianhydride. The tetracarboxylic acid to diamine component molar ratio was 0.992. To the solution was added 0.198 g (0.60 mmol) of 3,3',4,4'-biphenyltetracarboxylic acid, followed by stirring at 25° C. for 3 hours to prepare an electrode binder resin precursor solution composition having a concentration of 18% by weight and a viscosity of 1270 poise.

The resulting electrode binder resin precursor solution composition was treated in the same manner as in Example 1 to prepare an electrode mixture paste, which was too viscous to be spread thinly on copper foil with a glass rod.

Comparative Example 3

An electrode binder resin precursor solution composition was prepared in the same manner as in Example 2, except that 4,4'-oxydianiline (ODA) was not used and that 14.62 g (0.05 mol) of 1,3-bis(4-aminophenoxy)benzene (TPE-R) was dissolved in 134 g of N-methyl-2-pyrrolidone. The solution composition had a concentration of 18% by weight and a viscosity of 48 poise. The resulting electrode binder resin precursor solution composition was processed in the same manner as in Example 1 to make a 28 μm thick binder resin film. The characteristics of the film are shown in Table 1.

Comparative Example 4

In 221 g of N-methyl-2-pyrrolidone was dissolved 20.02 g (0.1 mol) of 4,4'-oxydianiline. To the solution was added 28.54 g (0.097 mol) of 3,3',4,4'-biphenyltetracarboxylic acid dianhydride, and the mixture was stirred at 25° C. in a nitrogen atmosphere for 24 hours to prepare a polyamic acid solution. The tetracarboxylic acid to diamine component molar ratio of the polyamic acid was 0.97. To the solution was added 0.991 g (3 0 mmol) of 3,3',4,4'-biphenyltetracarboxylic acid, followed by stirring at 25° C. for 3 hours to prepare an electrode binder resin precursor solution composition having a concentration of 18% by weight and a viscosity of 72 poise.

The resulting electrode binder resin precursor solution composition was processed in the same manner as in Example 1 to make a 26 μm thick binder resin film. The characteristics of the film are shown in Table 1.

Comparative Example 5

An electrode binder resin precursor solution composition was prepared in the same manner as in Example 2, except that 9.01 g (0.045 mol) of 4,4'-oxydianiline (ODA) and 1.46 g (0.005 mol) of 1,3-bis(4-aminophenoxy)benzene (TPE-R) were dissolved in 115 g of N-methyl-2-pyrrolidone. The ODA to TPE-R molar ratio in the polyamic acid was 9:1. The solution composition had a concentration of 18% by weight and a viscosity of 62 poise. The resulting electrode binder resin precursor solution composition was processed in the same manner as in Example 1 to make a 25 μm thick binder resin film. The characteristics of the film are shown in Table 1.

Comparative Example 6

In 221 g of N-methyl-2-pyrrolidone was dissolved 20.02 g (0.1 mol) of 2,2'-bis(4-aminophenoxyphenyl)propane (BAPP). To the solution was added 28.54 g (0.097 mol) of 3,3',4,4'-benzophenonetetracarboxylic acid dianhydride (BTDA), and the mixture was stirred at 25° C. in a nitrogen atmosphere for 24 hours to prepare a polyamic acid solution. The tetracarboxylic acid to diamine component molar ratio of the polyamic acid was 0.97. To the solution was added 0.991 g (3.0 mmol) of 3,3',4,4'-biphenyltetracarboxylic acid, followed by stirring at 25° C. for 3 hours to prepare an electrode binder resin precursor solution composition having a concentration of 18% by weight and a viscosity of 27 poise.

The resulting electrode binder resin precursor solution composition was processed in the same manner as in Example 1 to make a 26 μm thick binder resin film. The characteristics of the film are shown in Table 1.

TABLE 1

|  |  | Example | | | Comparative Example | | | | |
|---|---|---|---|---|---|---|---|---|---|
|  |  | 1 | 2 | 3 | 1 | 3 | 4 | 5 | 6 |
| Solution Composition | Polyamic Acid: |  |  |  |  |  |  |  |  |
|  | BPDA*[1] (mol) | 0.073 | 0.0485 | 0.0485 | 0.073 | 0.0485 | 0.097 | 0.0485 | BTDA*[7]: 0.097 |
|  | TPE-R*[2] (mol) | 0.03 | 0.035 | 0.01 | 0.03 | 0.05 | — | 0.005 | BAPP*[8]: 0.01 |
|  | ODA*[3] (mol) | 0.045 | 0.015 | 0.04 | 0.045 | — | 0.1 | 0.0045 | — |
|  | acid/amine (molar ratio) | 0.97 | 0.97 | 0.97 | 0.97 | 0.97 | 0.97 | 0.97 | 0.97 |
|  | composition*[4] | 6:4 | 3:7 | 8:2 | 6:4 | 0:10 | 10:0 | 9:1 |  |
|  | Solvent | NMP*[6] | NMP | NMP | NMP | NMP | NMP | NMP | NMP |
|  | BPTA*[5] (mol) | 0.00225 | 0.0015 | 0.0015 | — | 0.0015 | 0.003 | 0.0015 | 0.003 |
|  | Concentration (wt %) | 18 | 18 | 18 | 18 | 18 | 18 | 18 | 18 |
| Characteristics | Percent swell (wt %) | 0 | 2 | 0 | 0 | 2 | 0 | 1 | 8 |
|  | Elongation at Break (%) dry | 145 | 179 | 134 | 68 | 70 | 80 | 75 | 57 |
|  | swollen | 152 | 168 | 137 | 49 | 78 | 78 | 83 | 78 |
|  | Breaking Energy (J/cm$^3$) dry | 178 | 199 | 154 | 60 | 69 | 132 | 102 | 67 |
|  | swollen | 163 | 179 | 162 | 54 | 73 | 128 | 98 | 49 |
|  | Elastic Modulus (GPa) dry | 3.1 | 2.9 | 3.3 | 3.0 | 3.3 | 3.4 | 3.5 | 3.1 |
|  | swollen | 3.0 | 2.7 | 3.3 | 3.0 | 3.2 | 3.4 | 3.4 | 2.7 |

*[1]BPDA: 3,3',4,4'-biphenyltetracarboxylic acid dianhydride
*[2]TPE-R: 1,3-bis(4-aminophenoxy)benzene
*[3]ODA: 4,4'-oxydianiline
*[4]composition: ODA:TPE-R molar ratio
*[5]BPTA: 3,3',4,4'-biphenyltetracarboxylic acid
*[6]NMP: N-methyl-2-pyrrolidone
*[7]BTDA: benzophenonetetracarboxylic acid dianhydride
*[8]BAPP: 2,2-bis[4-(4-aminophenoxy)phenyl]propane

The invention claimed is:

1. A binder resin precursor solution composition for electrode comprising (A) a polyamic acid comprising repeating units represented by chemical formulae (1) and (2) below in a (1) to (2) molar ratio of 2:8 to 8.5:1.5 and having a tetracarboxylic acid component to diamine component molar ratio of 0.94 to 0.99, (B) a carboxylic acid compound having two pairs of carboxyl groups per molecule or an ester thereof, and (C) a solvent

[Chem. 1]

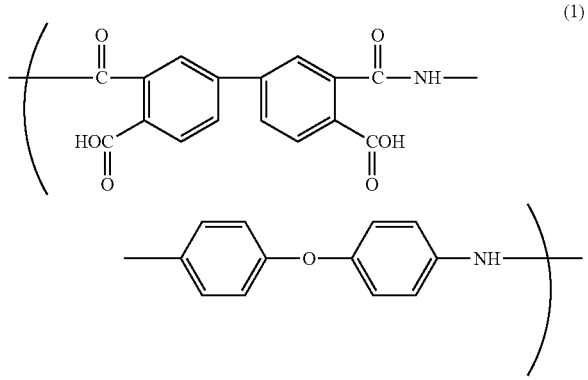

(1)

[Chem. 2]

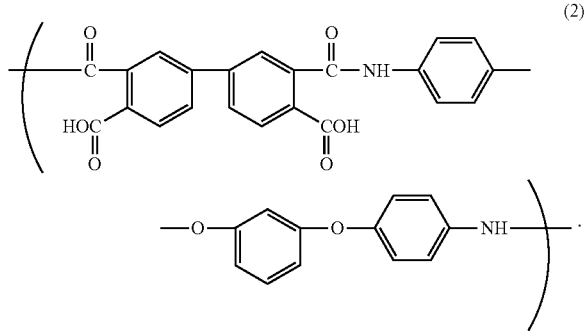

(2)

2. The binder resin precursor solution composition for electrode according to claim 1, wherein the mole number of the carboxylic acid compound having two pairs of carboxyl groups per molecule or an ester thereof as component (B) is 0.9 to 1.1 times the difference between the mole number of the diamine component and that of the tetracarboxylic acid component in the polyamic acid as component (A).

3. The binder resin precursor solution composition for electrode according to claim 1, which yields a binder resin having a weight gain of 5% by weight or less after 24 hours immersion in dimethyl carbonate at 50° C.

4. The binder resin precursor solution composition for electrode according to claim 1, which yields a binder resin having a tensile elongation at break of 120% or more and a tensile breaking energy of 130 J/cm$^3$ or more as measured after 24 hours immersion in dimethyl carbonate at 50° C. followed by no drying.

5. An electrode mixture paste comprising the binder precursor solution composition for electrode according to claim 1 and an electrode active material.

6. An electrode obtained by applying the electrode mixture paste according to claim 5 to a current collector and heating the applied electrode mixture paste to remove the solvent and cause imidization.

7. The electrode mixture paste according to claim 5, wherein the electrode active material is carbon powder, silicon powder, tin powder, or powder of an alloy containing silicon or tin.

8. A negative electrode for a lithium ion secondary battery obtained by applying the electrode mixture paste according to claim 7 to a current collector and heating the applied electrode mixture paste to remove the solvent and cause imidization.

9. The binder resin precursor solution composition for electrode according to claim 2, which yields a binder resin having a weight gain of 5% by weight or less after 24 hours immersion in dimethyl carbonate at 50° C.

10. The binder resin precursor solution composition for electrode according to claim 2, which yields a binder resin having a tensile elongation at break of 120% or more and a tensile breaking energy of 130 J/cm$^3$ or more as measured after 24 hours immersion in dimethyl carbonate at 50° C. followed by no drying.

11. The binder resin precursor solution composition for electrode according to claim 3, which yields a binder resin having a tensile elongation at break of 120% or more and a tensile breaking energy of 130 J/cm$^3$ or more as measured after 24 hours immersion in dimethyl carbonate at 50° C. followed by no drying.

12. An electrode mixture paste comprising the binder precursor solution composition for electrode according to claim 2 and an electrode active material.

13. An electrode mixture paste comprising the binder precursor solution composition for electrode according to claim 3 and an electrode active material.

14. An electrode mixture paste comprising the binder precursor solution composition for electrode according to claim 4 and an electrode active material.

15. The binder resin precursor solution composition for electrode according to claim 9, which yields a binder resin having a tensile elongation at break of 120% or more and a tensile breaking energy of 130 J/cm$^3$ or more as measured after 24 hours immersion in dimethyl carbonate at 50° C. followed by no drying.

16. An electrode mixture paste comprising the binder precursor solution composition for electrode according to claim 9 and an electrode active material.

17. An electrode mixture paste comprising the binder precursor solution composition for electrode according to claim 10 and an electrode active material.

18. An electrode mixture paste comprising the binder precursor solution composition for electrode according to claim 11 and an electrode active material.

19. An electrode mixture paste comprising the binder precursor solution composition for electrode according to claim 15 and an electrode active material.

* * * * *